(12) United States Patent
Takesue et al.

(10) Patent No.: US 6,329,458 B1
(45) Date of Patent: Dec. 11, 2001

(54) GOLF BALL COVER COMPOSITIONS AND GOLF BALLS

(75) Inventors: Rinya Takesue; Yasushi Ichikawa; Shunichi Kashiwagi, all of Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 09/448,425

(22) Filed: Nov. 24, 1999

(30) Foreign Application Priority Data

Nov. 26, 1998 (JP) .................................... 10-335212

(51) Int. Cl.$^7$ .......................... A63B 37/12; A63B 37/06; C08K 5/09

(52) U.S. Cl. ..................... 524/400; 524/394; 524/398; 524/399; 473/351; 473/365; 473/376; 473/377; 473/378; 473/379; 473/380; 473/381; 473/382; 473/383; 473/384

(58) Field of Search ................ 524/394, 398, 524/399, 400; 473/351, 376, 377, 378, 385, 379, 380, 381, 382, 383, 384, 365

(56) References Cited

U.S. PATENT DOCUMENTS

| | | | |
|---|---|---|---|
| 5,120,791 | 6/1992 | Sullivan | 525/196 |
| 5,306,760 | 4/1994 | Sullivan | 524/400 |
| 5,312,857 | * 5/1994 | Sullivan | 524/400 |
| 5,324,783 | 6/1994 | Sullivan | 525/196 |
| 5,328,959 | 7/1994 | Sullivan | 525/196 |
| 5,559,188 | * 9/1996 | Egashira et al. | 473/385 |
| 5,605,968 | * 2/1997 | Egashira et al. | 473/385 |
| 5,779,561 | * 7/1998 | Sullivan et al. | 473/378 |
| 5,803,831 | * 9/1998 | Sullivan et al. | 473/377 |
| 5,902,855 | * 5/1999 | Sullivan | 473/378 |
| 5,948,859 | * 9/1999 | Sano et al. | 473/365 |
| 6,034,182 | * 3/2000 | Kashiwagi et al. | 473/351 |
| 6,100,321 | * 8/2000 | Chen | 524/400 |

FOREIGN PATENT DOCUMENTS 5-3931   1/1993   (JP) .

* cited by examiner

*Primary Examiner*—Peter Szekely
(74) *Attorney, Agent, or Firm*—Sughrue Mion, PLLC

(57) ABSTRACT

An ionomer resin component containing (a) a ternary ionomer resin and optionally (b) a binary ionomer resin, optionally blended with (c) a non-neutralized olefin-unsaturated carboxylic acid random copolymer, is blended with (d) a metal soap of a fatty acid neutralized with a Ca, Mg or Zn cation in a weight ratio from 95:5 to 80:20. A golf ball cover composition based on this mixture has a melt index of 1–10 dg/sec. The cover composition is drastically improved in moldability, resilience and paint coating adhesion. A golf ball having a cover made of the composition is improved in feel and flight performance.

24 Claims, No Drawings

GOLF BALL COVER COMPOSITIONS AND GOLF BALLS

This invention relates to golf ball cover compositions and golf balls. More particularly, it relates to ionomer resin base cover compositions and golf balls having a cover made thereof.

BACKGROUND OF THE INVENTION

Ionomer resins have been widely used as the golf ball cover material. Since ionomer resins can impart improved play characteristics such as durability and resilience, they are advantageously used as the base resin of golf ball cover materials.

The ionomer resins are ionic copolymers of an olefin such as ethylene and an unsaturated carboxylic acid such as methacrylic acid or maleic acid wherein some acidic groups are neutralized with a metal ion such as sodium, lithium, zinc or magnesium ion.

The use of the ionomer resins as the golf ball cover material, however, has drawbacks including a hard hitting feel and the lack of flexibility necessary to impart a sufficient spin to control the ball in flight. Since the ionomer resins are relatively hard, the ball cannot be fully impressed against the club head surface upon impact so that the ball may receive a reduced spin rate. If a harder ionomer resin is used as the cover material, the feel of the ball accordingly becomes very hard.

It is thus desirable to have a golf ball having good spin properties and a pleasant feel in which experienced low-handicap golfers and professional golfers are interested. Great efforts have been made to this end.

Specifically, in order to overcome the drawback of ionomer resin that the feel of the ball when hit is hard and to further improve the resilience characteristic of ionomer resin, a number of golf ball cover compositions have been proposed. For example, JP-A 5-3931 discloses a cover composition in which a soft ionomer resin obtained by neutralizing an olefin-acrylic acid-(meth)acrylate ternary copolymer is blended with a high hardness ionomer resin for the purpose of improving the feel of the ball when hit. Using as the cover material a mixture of a hard ionomer resin and a soft ternary ionomer resin containing a (meth)acrylate as one monomer, the ball is increased in distance at no sacrifice of durability.

The cover material comprising in simple admixture the hard ionomer resin and the soft ternary ionomer resin maintains approximately equivalent resilience as compared with a single ionomer resin of the same hardness, but fails to achieve a significant improvement in resilience.

U.S. Pat. Nos. 5,312,857 and 5,306,760 disclose cover compositions in which high levels of metal soaps are added to ionomer resins for the purpose of improving the cost and resilience of ionomer cover material. Allegedly, these compositions are cost effective and increased in resilience (or coefficient of restitution) as compared with prior art ionomer cover materials.

The cover compositions of these patents, however, have very low paint coatability. When the cover of a two-piece ball or the outer cover layer of a multi-piece ball is made of such a cover composition and coated with paint, the cover is often repellent to the paint coating. Even when the paint coating uniformly adheres to the cover, the coating can be readily peeled off by impact. As compared with ionomer resin covers of the same hardness, an improvement in resilience is made by the addition of metal soaps to the same extent or a slightly greater extent, but not to a greater extent. A particular type of metal soap added can significantly detract from moldability and resilience. From these points of view, the cover compositions of the above patents are unacceptable for practical use.

SUMMARY OF THE INVENTION

An object of the invention is to provide a golf ball cover composition which has improved moldability, resilience and coating receptivity while providing the ball with a pleasant feel when hit. Another object of the invention is to provide a golf ball using the cover composition.

In one aspect, the invention provides a golf ball cover composition primarily comprising a mixture of a base resin and a metal soap defined herein as (d). The base resin is comprised of an ionomer resin component containing (a) a ternary ionomer resin in the form of a metal ion neutralized product of an olefin-unsaturated carboxylic acid-unsaturated carboxylate copolymer having an acid content of up to 12% by weight and (b) a binary ionomer resin in the form of a metal ion neutralized product of an olefin-unsaturated carboxylic acid copolymer having an acid content of up to 15% by weight in a weight ratio of from 40:60 to 100:0. The ionomer resin component is blended with (c) a non-neutralized random copolymer formed from olefin and unsaturated carboxylic acid monomers in a weight ratio of from 75:25 to 100:0, yielding the base resin. The base resin is mixed with (d) a metal soap obtained by neutralizing an organic acid having up to 29 carbon atoms with a monovalent to trivalent metal ion. The weight ratio of the base resin to the metal soap is from 95:5 to 80:20. The composition has a melt index (MI) of at least 1 dg/sec.

Preferably, the mixture has a Shore D hardness which is higher than the Shore D hardness of the base resin by 1 to 5 units.

In one preferred embodiment, the metal soap (d) has been formed by double decomposition. The metal soap is selected from among magnesium stearate, calcium stearate, zinc stearate or a mixture thereof, and more preferably is a mixture of magnesium stearate and calcium stearate in a weight ratio of from 25:75 to 75:25.

The golf ball cover composition may further contain (e) 0.5 to 5 parts by weight of an epoxy group-modified polyolefin or acid-modified polyolefin wax per 100 parts by weight of the mixture.

Also contemplated herein is a golf ball comprising a core and a cover formed around the core. In one embodiment, the cover is formed of the cover composition of the invention. In another embodiment, the cover has a multilayer structure of at least two layers, and at least one layer of the cover other than the outermost layer is formed of the cover composition of the invention.

The cover composition of the invention is based on the mixture of the ionomer resin-containing base resin and the metal soap. As compared with the prior art ionomer resin/metal soap blend cover compositions, the cover composition of the invention is drastically improved in moldability, resilience and paint coating receptivity by optimizing its hardness and melt index. The golf ball having a cover made of the composition has improved resilience and a good feel when hit.

DESCRIPTION OF THE PREFERRED EMBODIMENTS

The cover composition of the invention contains the above-mentioned components (a) to (d), of which components (a) and (d) are essential and components (b) and (c) are optional.

Component (a) is essential to constitute the ionomer resin component in the inventive cover composition. It is a ternary ionomer resin comprising a metal ion neutralized product of an olefin-unsaturated carboxylic acid-unsaturated carboxylate copolymer. It is obtainable by polymerizing olefin, unsaturated carboxylic acid and unsaturated carboxylic ester monomers to form a random copolymer and neutralizing the copolymer with a metal ion.

The olefins used herein include those of 2 to 8 carbon atoms, preferably 2 to 6 carbon atoms, for example, ethylene, propylene, butene, hexene, heptene, and octene, with ethylene being preferred.

The unsaturated carboxylic acids used herein include, for example, acrylic acid, methacrylic acid, maleic acid and fumaric acid, with acrylic acid and methacrylic acid being preferred.

The unsaturated carboxylic esters used herein are lower alkyl esters of the above-described unsaturated carboxylic acids and include, for example, methyl methacrylate, methyl acrylate, ethyl methacrylate, ethyl acrylate, propyl methacrylate, and propyl acrylate.

Component (a) is a random copolymer of the olefin, unsaturated carboxylic acid and unsaturated carboxylic ester wherein some carboxyl groups in the unsaturated carboxylic acid are neutralized with metal ions. The degree of neutralization is generally 20 to 80 mol %, preferably 25 to 75 mol %. With too low a degree of neutralization, the cover composition would become short of rigidity and hence, resilience. With too high a degree of neutralization, the cover composition would become less flowable and less workable and the cover would show no improvement in physical properties.

The metal ions used for neutralization include $Li^+$, $Na^+$, $K^+$, $Zn^{++}$, $Co^{++}$, $Ni^{++}$, $Cu^{++}$, $Pb^{++}$ and $Mg^{++}$, with the $Li^+$, $Na^+$, $Zn^{++}$ and $Mg^{++}$ being preferred. These metal ions may be given by salts of formic acid, acetic acid, nitric acid, and carbonic acid, hydrogen carbonate salts, oxides, hydroxides, and alkoxides.

The olefin-unsaturated carboxylic acid-unsaturated carboxylate copolymer to constitute the ternary ionomer resin as component (a) should have an unsaturated carboxylic acid content (simply referred to as acid content, hereinafter) of up to 12% by weight, preferably 8 to 12% by weight, and more preferably 10 to 12% by weight. With too low an acid content, the cover would have a low rigidity and sometimes poor resilience. An acid content in excess of 12% by weight would provide the cover with a too high rigidity and detract from the feel of the ball when hit.

The ternary ionomer resin as component (a) generally has a Shore D hardness of 60 to 35, and especially 56 to 40, though the hardness is not limited thereto.

Preferred as component (a) is a ternary ionomer resin comprising a metal ion neutralized product of an ethylene-(meth)acrylic acid-(meth)acrylate copolymer. Commercially available products used as the golf ball cover stock are applicable as component (a). Examples are Himilan 1855 and Himilan 1856 from Mitsui-Dupont Polychemical K.K. and Surlyn 8120 and Surlyn AD8542 from E. I. Dupont.

Component (b) is an optional component to be selected and blended depending on the amount of component (a) blended. It is a binary ionomer resin comprising a metal ion neutralized product of an olefin-unsaturated carboxylic acid copolymer having an acid content of up to 15% by weight.

The binary ionomer resin as component (b) is obtained by polymerizing olefin and unsaturated carboxylic acid monomers to form a random copolymer and neutralizing the copolymer with a metal ion. The olefin monomers, unsaturated carboxylic acid monomers, and metal ions used herein are the same as exemplified for component (a).

Component (b) is a random copolymer of the olefin and unsaturated carboxylic acid wherein some carboxyl groups in the unsaturated carboxylic acid are neutralized with metal ions. The degree of neutralization is generally 20 to 80 mol %, preferably 25 to 75 mol %. With too low a degree of neutralization, the cover composition would become short of rigidity and hence, resilience. With too high a degree of neutralization, the cover composition would become less flowable and less workable and the cover would show no improvement in physical properties.

The olefin-unsaturated carboxylic acid copolymer to constitute the binary ionomer resin as component (b) should have an unsaturated carboxylic acid content (simply acid content) of up to 15% by weight, preferably 8 to 15% by weight, and more preferably 10 to 15% by weight. With too low an acid content, the cover would have a low rigidity and sometimes poor resilience. An acid content in excess of 15% by weight would provide the cover with a too high rigidity and detract from the feel of the ball when hit.

The binary ionomer resin as component (b) generally has a Shore D hardness of 70 to 50, and especially 66 to 54, though the hardness is not limited thereto.

Similarly, commercially available products are applicable as component (b). Examples are Himilan 1605, Himilan 1706, Himilan 1557, Himilan 1601 and Himilan AM7311 from Mitsui-Dupont Polychemical K.K. and Surlyn 7930 from E. I. Dupont.

The golf ball cover composition contains as the ionomer resin component the ternary ionomer resin (a) and the binary ionomer resin (b) in a weight ratio of from 40:60 to 100:0, and especially from 50:50 to 100:0. With a too high weight ratio of (b) to (a), no improvement in resilience is achievable when the metal soap as component (d) is blended therewith. It is acceptable either to use the ternary ionomer resin (a) alone or to use the ternary ionomer resin (a) and the binary ionomer resin (b) in admixture. For each ionomer resin, one or a mixture of two or more species may be used.

Component (c) is an optional component to be used in admixture with the above-described ionomer resin component. It is a non-neutralized random copolymer formed from olefin and unsaturated carboxylic acid monomers. This corresponds to the above-described ionomer resin prior to neutralization and is well compatible with the ionomer resin. Blending component (c) in the ionomer resin component permits the melt viscosity to be adjusted as desired without detracting from physical properties. When the metal soap as component (d) is blended with the ionomer resin component to provide a heated mixture, component (c) is effective for preventing the melt viscosity from lowering and providing the desired melt index (MI). This is true especially when the blending of the metal soap (d) with the ionomer resin component gives a mixture having a lower melt viscosity and a MI of less than 1.0.

The olefin monomers and unsaturated carboxylic acid monomers used in the random copolymer (c) are the same as exemplified for component (a).

Similarly, commercially available products are applicable as component (c). Examples are Nucrel AN4311 and Nucrel 1560 from Mitsui-Dupont Polychemical K.K.

Component (c) is optionally blended with the above-described ionomer resin component to form the base resin. The base resin contains the ionomer resin component and component (c) in a weight ratio of from 75:25 to 100:0, and especially from 80:20 to 100:0. A base resin with a too much amount of the random copolymer (c) blended therein leads to such drawbacks as a loss of resilience, an unnecessarily increased melt viscosity and poor moldability when the metal soap as component (d) is blended with the base resin.

Component (d) is essential as well as component (a). It is a metal soap obtained by neutralizing an organic acid having up to 29 carbon atoms with a monovalent to trivalent metal ion.

The organic acids having up to 29 carbon atoms may be aliphatic, aromatic and alicyclic organic acids having up to 29 carbon atoms, preferably 3 to 29 carbon atoms, and more preferably 12 to 18 carbon atoms, with the aliphatic organic acids generally known as fatty acids being preferred. The fatty acid consists of a highly hydrophobic alkyl group and a hydrophilic carboxyl group. The fatty acids used herein may be either unsaturated fatty acids having a double or triple bond in the alkyl group or saturated fatty acids in which all bonds in the alkyl group are single bonds. Exemplary fatty acids are stearic acid, palmitic acid, myristic acid, 12-hydroxystearic acid, lauric acid, behenic acid, octanoic acid, oleic acid, linolic acid, and linoleic acid, with stearic acid being preferred.

Examples of the mono to trivalent metal ions used to neutralize the organic acids include $Li^+$, $Ca^{++}$, $Mg^{++}$, $Zn^{++}$, $Mn^{++}$, $Al^{+++}$, $Ni^{++}$, $Fe^{++}$, $Fe^{+++}$, $Cu^{++}$, $Sn^{++}$, $Pb^{++}$, and $Co^{++}$. Neutralization is preferably made with divalent metal ions, especially $Ca^{++}$, $Mg^{++}$ and $Zn^{++}$.

The metal soap can be prepared by any well-known method. Illustrative, non-limiting methods include a direct method of directly reacting an organic acid with a metal oxide or hydroxide and a double decomposition method of neutralizing an organic acid with sodium hydroxide or potassium hydroxide in solution, followed by reaction with a metal salt.

In the practice of the invention, the preferred component (d) is a metal soap prepared by the double decomposition method. As compared with the metal salt prepared by the direct method, the metal salt prepared by the double decomposition method has a high purity, a fine particle size and a uniform distribution of particle size. It is noted that the metal salt prepared by the direct method sometimes fails to improve resilience because of its poor dispersion.

Illustrative examples of the metal soap used herein include magnesium stearate, calcium stearate, zinc stearate, aluminum stearate, magnesium laurate, magnesium myristate, and magnesium palmitate. Of these, magnesium stearate, calcium stearate, and zinc stearate are recommended.

Although the metal soaps are effective for improving resilience even when used alone, a mixture of two or more metal soaps is more effective for improving resilience and thus preferable.

When a mixture of magnesium stearate and calcium stearate is used as the metal soap (d), magnesium stearate and calcium stearate are preferably mixed in a weight ratio of from 25:75 to 75:25, and especially from 40:60 to 60:40. Outside the range, the improvement in resilience sometimes becomes insufficient.

The cover composition of the invention contains as a main component a mixture in which the base resin consisting of components (a) to (c) and the metal soap (d) are blended in a weight ratio of from 95:5 to 80:20, and especially from 95:5 to 82:18. A too less amount of the metal soap (d) blended fails to achieve the improved resilience whereas a too much amount of the metal soap (d) blended drastically exacerbates the paint coating adhesion of the cover composition below the practically acceptable level.

Various additives may be added to the cover composition in order to further improve the performance thereof. For example, it is recommended to add an epoxy group-modified polyolefin or acid-modified polyolefin wax in order to improve the paint coating adhesion. The olefin component common to the epoxy-modified polyolefin and acid-modified polyolefin wax includes ethylene, propylene, butene, hexene and octene, with ethylene and propylene being preferred.

Examples of the epoxy-modified polyolefin include ethylene/glycidyl (meth)acrylate, ethylene/methyl acrylate/glycidyl (meth)acrylate, ethylene/(meth)acrylate/-glycidyl (meth)acrylate, and ethylene/glycidyl (meth)acrylate/vinyl acetate copolymers. Commercially available products of the epoxy-modified polyolefin are useful, for example, Elvaloy AS and Elvaloy EP4934-6 by Mitsui-Dupont Polychemical K.K.

The acid-modified polyolefin wax preferably has an acid value of 1 to 60 mg KOH/g, more preferably 10 to 60 mg KOH/g, as measured by the titration method. A wax with a lower acid value would be ineffective for improving the paint coating adhesion whereas a wax with a higher acid value would rather detract from resilience. Exemplary acid components of the acid-modified polyolefin wax include maleic acid, maleic anhydride and sulfonic acid. Preferred are the acid components containing a carboxyl group or acid anhydride group such as maleic acid and maleic anhydride. In the acid-modified polyolefin wax, a polymerizable monomer having an aliphatic unsaturated bond other than the olefin, for example, an acrylate, methacrylate or vinyl acetate may be used as a comonomer for the softening purpose. Exemplary such acrylates and methacrylates are esters of (meth)acrylic acid with aliphatic alcohols of 1 to 5 carbon atoms in which some hydrogen atoms attached to carbon atoms may be replaced by hydroxyl or other groups, for example, methyl (meth)acrylate, ethyl (meth)acrylate, and butyl (meth)acrylate. Commercially available products of the acid-modified polyolefin wax are useful, for example, Umex 2000 and Umex 1000 from Sanyo Chemicals Industry K.K. and Bondyne AX8390 from Sumitomo Chemical K.K.

While the epoxy-modified polyolefin or acid-modified polyolefin wax is advantageously added for the purpose of improving the paint coating adhesion as mentioned above, its appropriate amount is 0.5 to 5 parts, especially 1 to 3 parts by weight per 100 parts by weight of the mixture of components (a) to (d). Less amounts would fail to achieve the improvement of coating adhesion whereas excessive amounts would detract from resilience.

If desired, various other additives are blended in the cover composition of the invention. Exemplary such additives are pigments, dispersants, antioxidants, UV absorbers, and light stabilizers.

The heated mixture of the base resin consisting of components (a) to (c) and the metal soap (d) preferably has a specific gravity of 0.9 to 1.5, more preferably 0.9 to 1.3, and most preferably 0.9 to 1.1, though not limited thereto.

The cover composition should have a melt index (MI) of at least 1 dg/sec, and especially 1 to 10 dg/sec, as measured by the method of JIS K-7210. A lower melt index indicates poor moldability.

In connection with the cover composition of the invention, the Shore D hardness of the mixture of the base resin consisting of components (a) to (c) and the metal soap (d) should preferably be higher than the Shore D hardness of the base resin, typically by 1 to 5 Shore D units and especially 1 to 3 Shore D units. If the difference of Shore D hardness between the mixture and the base resin is too small, the addition of the metal soap (d) would fail to achieve a drastic increase of resilience. If the difference is too large, the addition of the metal soap (d) achieves an increase of hardness, but would sometimes fail to increase resilience.

The cover composition of the invention is prepared, for example, by mixing the above-described components at 150 to 250° C. for ½ to 15 minutes, especially ½ to 10 minutes. The mixer used herein may be an internal mixer such as a kneading twin-screw extruder, Banbury mixer or kneader. The procedure of blending various additives other than the essential components is not critical. Exemplary are a procedure of blending the additives with the essential components so that they are simultaneously heated and mixed, and a procedure of previously heating and mixing the essential components and adding the additives thereto, followed by further heating and mixing.

In the second aspect, the invention provides a golf ball comprising a core and a cover enclosing the core. The cover is constructed of the cover composition of the invention. The ball has many advantages including a good outer appearance, increased flight distance and improved feel.

As long as the cover is constructed of the cover composition of the invention, the golf ball may have any desired structure. Illustratively, the invention is applicable to both wound golf balls in which a cover of one or more layers is formed around a wound core comprising a solid or liquid center with thread rubber wound thereon; and solid golf balls such as two, three and multi-piece solid golf balls in which a cover of one or more layers is formed around a solid core.

The cover of the golf ball may be formed solely of the cover composition of the invention while the cover composition of the invention may be combined with any well-known cover stock. When a multi-layer cover is formed by combining with the known cover stock, the cover layer constructed of the cover composition of the invention may be the outermost layer or any inner layer other than the outermost layer. It is recommended that at least one layer of the cover inner layers other than the outermost layer be constructed of the cover composition of the invention.

For the golf ball of the invention, the core may be prepared by any well-known method. More illustratively, the wound core comprising a solid or liquid center with thread rubber wound thereon or the solid core can be prepared in a conventional way.

Any well-known method may be employed in preparing the solid center of the wound golf ball or the solid core of the solid golf ball. More particularly, the solid center or solid core is prepared, for example, by blending 100 parts by weight of cis-1,4-polybutadiene, about 10 to 60 parts by weight of at least one vulcanizing or crosslinking agent selected from $\alpha,\beta$-monoethylene unsaturated carboxylic acids (e.g., acrylic acid and methacrylic acid) or metal salts thereof and functional monomers (e.g., trimethylol propane methacrylate), about 5 to 30 parts by weight of a filler such as zinc oxide or barium sulfate, about 0.5 part by weight of a peroxide such as dicumyl peroxide, and optionally, about 0.1 to 1 part by weight of an antioxidant to form a rubber composition. The rubber composition is press vulcanized or crosslinked and heat compressed at 140 to 170° C. for 10 to 40 minutes into a spherical shape.

In preparing the liquid center of the wound golf ball, a hollow spherical center bag is formed from the above-described rubber composition and then filled with a liquid in a conventional manner.

Also the thread rubber used in the wound core may be prepared by a conventional method, for example, by molding and vulcanizing a rubber composition comprising natural rubber or synthetic rubber (e.g., polyisoprene rubber) and various additives such as an antioxidant, vulcanization accelerator and sulfur.

The wound core may be prepared by winding under tension the thread rubber around the solid or liquid center prepared as above.

Understandably, various parameters such as diameter, weight and hardness of the solid center, liquid center, solid core and wound core may be properly adjusted as desired insofar as the objects of the invention are attainable. That is, these parameters are not particularly limited.

The golf ball is obtained by forming the cover around the core in a conventional manner. One typical method is a compression molding method involving previously molding the cover composition into a pair of hemispherical half-shells, encasing the core within the half-shells, and effecting compression molding at 120 to 170° C. for 1 to 5 minutes. Another method is by placing the core within a mold and injection molding the cover composition into the mold cavity. The injection molding method is especially preferable.

The cover formed in this way has a (radial) thickness which is not critical although the cover thickness is preferably 1 to 4 mm, especially 1.3 to 2.3 mm. The cover is not limited to one layer. When the cover is formed to a multilayer structure of two or more layers, the overall thickness of the cover should preferably fall within the above-defined range. In the embodiment wherein the cover is formed to a multilayer structure, it is recommended that the cover layer constructed of the cover composition of the invention have a thickness of 1.3 to 2.3 mm.

The cover formed in this way is provided on its surface with a multiplicity of dimples. The dimples may be properly adjusted in accordance with the desired dimple arrangement. The cover is then subjected to various surface treatments such as plasma treatment, stamping and paint coating.

The golf balls of the invention for competition play are prepared in accordance with the Rules of Golf to a diameter of not less than 42.67 mm and a weight of not greater than 45.93 g.

EXAMPLE

Examples of the invention are given below by way of illustration and not by way of limitation.

Examples 1–22 and Comparative Examples 1–9

A solid core having a diameter of 38.6 mm, a weight of 35.1 grams, and a hardness corresponding to a deflection of 3.1 mm under an applied load of 100 kg was prepared using a core composition based on cis-1,4-polybutadiene. The core was set in an injection mold.

A cover stock was prepared by heat mixing the components shown in Tables 1 to 6 in a mixing twin-screw extruder at 200° C. for 1/2 minute and chopping the extrudate into pellets. The cover stock was injected around the core in the mold, forming a two-piece solid golf ball having a cover of 2.1 mm thick and a diameter of 42.8 mm.

Example 23 and Comparative Example 10

A solid core having a diameter of 36.8 mm, a weight of 30.4 grams, and a hardness corresponding to a deflection of 3.1 mm under an applied load of 100 kg was prepared using a core composition based on cis-1,4-polybutadiene. The core was set in an injection mold.

Cover inner and outer layers were formed around the core by injection molding the cover stocks as formulated in Table 7, respectively. A three-piece solid golf ball having a diameter of 42.8 mm was obtained.

The golf balls thus obtained were examined for hardness, initial velocity, and coating adhesion by the following tests. The results shown in the respective Tables.

Ball Hardness

Ball hardness was expressed by a deflection (mm) of a ball under an applied load of 100 kg.

Initial Velocity

Using an apparatus of the type approved by USGA, an initial velocity was measured as prescribed by USGA.

Coating Adhesion

The respective cover stock resins were melted at 160° C. and press molded into test sheets of 1 mm thick. A urethane paint for golf balls was applied to the test sheet to a thickness of 15 $\mu$m, dried at 50° C., and left to stand at room temperature for 48 hours.

Then, a crosscut adhesive tape test was carried out according to JIS K-5400. The coated sheet was scribed in perpendicular directions at a predetermined line spacing to define 100 square sections in total. Adhesive tape was applied to the crosscut sheet and then peeled therefrom. After tape peeling, the coating was visually observed to inspect whether or not coating sections were separated, and rated according to the following criteria.

| Point | Remarks |
| --- | --- |
| 10 | Each cut line was narrow and flanked by smooth edges. No separation was found at intersections between cut lines. No square sections were peeled. |
| 8 | Slight separation was found at intersections between cut lines. No square sections were peeled. Defective areas accounted for less than 5% of the total area of square sections. |
| 6 | Separation was found at opposite edges of cut lines and at intersections between cut lines. Defective areas accounted for 5% to less than 15% of the total area of square sections. |
| 4 | Separation was found over some extent along cut lines. Defective areas accounted for 15% to less than 35% of the total area of square sections. |
| 2 | Separation was found over a more extent along cut lines. Defective areas accounted for 35% to less than 65% of the total area of square sections. |
| 0 | Separation was found over a further extent along cut lines. Defective areas accounted for 65% or more of the total area of square sections. |

Materials Used

Himilan: ionomer resins by Mitsui Dupont Polychemical K.K.

1855: zinc ion neutralized ternary ionomer resin acid content 10 wt %, Shore D hardness 54

1706: zinc ion neutralized binary ionomer resin acid content 15 wt %, Shore D hardness 60

1605: sodium ion neutralized binary ionomer resin acid content 15 wt %, Shore D hardness 61

1601: sodium ion neutralized binary ionomer resin acid content 10 wt %, Shore D hardness 56

1557: zinc ion neutralized binary ionomer resin acid content 12 wt %, Shore D hardness 57

Surlyn: ionomer resins by E. I. Dupont

8120: sodium ion neutralized ternary ionomer resin acid content 10 wt %, Shore D hardness 45

AD8542: magnesium ion neutralized ternary ionomer resin, acid content 10 wt %, Shore D hardness 44

Elvaloy EP4934-6:

glycidyl methacrylate-modified ethylene-acrylate-glycidyl methacrylate copolymer, by E. I. Dupont Umex 2000:

maleic anhydride-modified polyethylene wax, by Sanyo Chemicals Industry K.K.

Magnesium stearate:

magnesium stearate by double decomposition, by Nippon Oil and Fats K.K.

Calcium stearate:

calcium stearate by double decomposition, by Nippon Oil and Fats K.K.

Magnesium stearate (direct):

magnesium stearate by direct method, by Nippon Oil and Fats K.K.

Zinc stearate:

zinc stearate by double decomposition, by Nippon Oil and Fats K.K.

Calcium stearate (direct):

calcium stearate by direct method, by Nippon Oil and Fats K.K.

Nucrel AN4311:

ethylene-methacrylic acid copolymer, acid content 8 wt %, Shore D hardness 25 by Mitsui Dupont Polychemical K.K.

It is noted that throughout the Tables, the amounts of ingredients are expressed in parts by weight.

TABLE 1

| | E1 | E2 | E3 | E4 | E5 | E6 | CE1 | CE2 | CE3 |
| --- | --- | --- | --- | --- | --- | --- | --- | --- | --- |
| Himilan 1855 | 95 | 85 | 80 | 85 | 85 | 85 | 100 | 99 | 70 |
| Elvaloy EP4934-6 | | | | 2 | | | | | |
| Umex 2000 | | | | | 2 | | | | |
| Magnesium stearate | 5 | 15 | 20 | 15 | 15 | | | 1 | 30 |
| Magnesium stearate (direct) | | | | | | 15 | | | |
| Titanium dioxide | 4 | 4 | 4 | 4 | 4 | 4 | 4 | 4 | 4 |
| Specific gravity | 0.99 | 1.00 | 1.00 | 1.00 | 1.00 | 1.00 | 0.99 | 0.99 | 1.00 |

TABLE 1-continued

|  | E1 | E2 | E3 | E4 | E5 | E6 | CE1 | CE2 | CE3 |
|---|---|---|---|---|---|---|---|---|---|
| Shore D hardness | 55 | 55 | 56 | 55 | 55 | 55 | 54 | 54 | 56 |
| MI (dg/sec) | 1.39 | 1.40 | 1.41 | 1.18 | 1.36 | 1.39 | 1.39 | 1.39 | 1.40 |
| Ball weight (g) | 45.2 | 45.3 | 45.3 | 45.3 | 45.3 | 45.3 | 45.2 | 45.2 | 45.3 |
| Ball hardness (mm) | 2.72 | 2.72 | 2.71 | 2.72 | 2.72 | 2.72 | 2.78 | 2.73 | 2.71 |
| Initial velocity (m/s) | 76.0 | 76.0 | 76.0 | 76.0 | 76.0 | 75.9 | 75.8 | 75.8 | 75.8 |
| Coating adhesion (point) | 9 | 9 | 9 | 10 | 10 | 9 | 9 | 10 | 6 |

TABLE 2

|  | E7 | E8 | CE1 | CE4 |
|---|---|---|---|---|
| Himilan 1855 | 88 | 76.5 | 100 | 59.5 |
| Nucrel AN4311 |  | 8.5 |  | 25.5 |
| Zinc stearate | 12 | 15 |  | 15 |
| Titanium dioxide | 4 | 4 | 4 | 4 |
| Specific gravity | 1.01 | 1.01 | 0.99 | 1.00 |
| Shore D hardness | 55 | 52 | 54 | 46 |
| MI (dg/sec) | 1.06 | 3.36 | 1.39 | 8.17 |
| Ball weight (g) | 45.3 | 45.3 | 45.2 | 45.3 |
| Ball hardness (mm) | 2.69 | 2.73 | 2.78 | 2.82 |
| Initial velocity (m/s) | 75.9 | 75.9 | 75.8 | 75.5 |
| Coating adhesion (point) | 9 | 9 | 9 | 9 |

TABLE 3

|  | E9 | E10 | E11 | CE1 |
|---|---|---|---|---|
| Himilan 1855 | 95 | 76.5 | 95 | 100 |
| Nucrel AN4311 |  | 8.5 |  |  |
| Calcium stearate | 5 | 15 |  |  |
| Calcium stearate (direct) |  |  | 5 |  |
| Titanium dioxide | 4 | 4 | 4 | 4 |
| Specific gravity | 0.99 | 1.00 | 1.00 | 0.99 |
| Shore D hardness | 55 | 54 | 55 | 54 |
| MI (dg/sec) | 1.05 | 2.82 | 1.03 | 1.39 |
| Ball weight (g) | 45.2 | 45.3 | 45.3 | 45.2 |
| Ball hardness (mm) | 2.73 | 2.74 | 2.70 | 2.78 |
| Initial velocity (m/s) | 76.0 | 76.0 | 75.9 | 75.8 |
| Coating adhesion (point) | 9 | 9 | 9 | 9 |

TABLE 4

|  | E12 | E13 | E14 | E15 | CE5 |
|---|---|---|---|---|---|
| Surlyn 8120 | 85 | 85 | 85 | 85 | 100 |
| Magnesium stearate | 15 |  |  | 7.5 |  |
| Zinc stearate |  | 15 |  |  |  |
| Calcium stearate |  |  | 15 | 7.5 |  |
| Titanium dioxide | 4 | 4 | 4 | 4 | 4 |
| Specific gravity | 0.99 | 1.00 | 0.99 | 0.99 | 0.98 |
| Shore D hardness | 46 | 47 | 48 | 47 | 45 |
| MI (dg/sec) | 2.85 | 3.47 | 1.63 | 2.21 | 1.13 |
| Ball weight (g) | 45.3 | 45.3 | 45.3 | 45.2 | 45.2 |
| Ball hardness (mm) | 2.76 | 2.71 | 2.74 | 2.75 | 2.80 |
| Initial velocity (m/s) | 76.0 | 75.8 | 76.0 | 76.1 | 75.6 |
| Coating adhesion (point) | 9 | 9 | 9 | 9 | 9 |

TABLE 5

|  | E16 | E17 | E18 | E19 | CE6 |
|---|---|---|---|---|---|
| Surlyn AD8542 | 85 | 85 | 85 | 85 | 100 |
| Magnesium stearate | 15 |  |  | 7.5 |  |
| Zinc stearate |  | 15 |  |  |  |
| Calcium stearate |  |  | 15 | 7.5 |  |
| Titanium dioxide | 4 | 4 | 4 | 4 | 4 |
| Specific gravity | 0.99 | 1.01 | 1.00 | 1.00 | 0.99 |
| Shore D hardness | 48 | 45 | 49 | 49 | 44 |
| MI (dg/sec) | 2.54 | 2.70 | 1.57 | 2.15 | 0.91 |
| Ball weight (g) | 45.2 | 45.2 | 45.3 | 45.3 | 45.2 |
| Ball hardness (mm) | 2.84 | 2.86 | 2.84 | 2.83 | 2.87 |
| Initial velocity (m/s) | 75.9 | 75.5 | 75.9 | 76.1 | 75.2 |
| Coating adhesion (point) | 9 | 9 | 9 | 9 | 9 |

TABLE 6

|  | E20 | E21 | E22 | CE7 | CE8 | CE9 |
|---|---|---|---|---|---|---|
| Himilan 1855 | 42.5 |  |  | 50 |  |  |
| Himilan 1706 |  | 42.5 |  |  | 50 |  |
| Surlyn 8120 |  | 42.5 |  |  | 50 |  |
| Himilan 1605 | 42.5 |  | 42.5 | 50 |  | 50 |
| Surlyn AD8542 |  |  | 42.5 |  |  | 50 |
| Magnesium stearate | 15 | 15 | 15 |  |  |  |
| Titanium dioxide | 4 | 4 | 4 | 4 | 4 | 4 |
| Specific gravity | 0.99 | 0.99 | 0.99 | 1.00 | 0.99 | 1.00 |
| Shore D hardness | 58 | 56 | 53 | 57 | 55 | 50 |
| MI (dg/sec) | 2.10 | 1.12 | 1.86 | 1.90 | 0.84 | 1.88 |
| Ball weight (g) | 45.2 | 45.2 | 45.2 | 45.3 | 45.2 | 45.3 |
| Ball hardness (mm) | 2.65 | 2.68 | 2.72 | 2.74 | 2.75 | 2.79 |
| Initial velocity (m/s) | 76.1 | 76.0 | 76.0 | 76.0 | 75.9 | 75.7 |
| Coating adhesion (point) | 9 | 9 | 9 | 9 | 9 | 9 |

TABLE 7

|  |  | E23 | CE10 |
|---|---|---|---|
| Cover inner layer | Himilan 1855 | 85 | 100 |
|  | Magnesium stearate | 15 |  |
|  | Gage (mm) | 1.5 | 1.5 |
|  | Shore D hardness | 53 | 52 |
|  | Specific gravity | 1.00 | 0.99 |
|  | MI (dg/sec) | 1.40 | 1.39 |
| Cover outer layer | Himilan 1557 | 50 | 50 |
|  | Himilan 1601 | 50 | 50 |
|  | Titanium dioxide | 4 | 4 |
|  | Gage (mm) | 1.5 | 1.5 |
|  | Shore D hardness | 60 | 60 |
|  | Specific gravity | 0.99 | 0.99 |
|  | MI (dg/sec) | 2.20 | 2.20 |
| Golf ball | weight (g) | 45.2 | 45.2 |
|  | Hardness (mm) | 2.65 | 2.67 |
|  | Initial velocity (m/s) | 76.1 | 75.9 |

There has been described a cover composition based on the mixture of the ionomer resin-containing base resin and the metal soap. As compared with the prior art ionomer resin/metal soap blend cover compositions, the cover composition of the invention is drastically improved in moldability, resilience and paint coating adhesion. The golf ball having a cover made of the composition is improved in feel and flight performance.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball cover composition primarily comprising a mixture of a base resin comprising an ionomer resin component containing (a) a ternary ionomer resin in the form of a metal ion neutralized product of an olefin-unsaturated carboxylic acid-unsaturated carboxylate copolymer having an acid content of up to 12% by weight and (b) a binary ionomer resin in the form of a metal ion neutralized product of an olefin-unsaturated carboxylic acid copolymer, and (c) a non-neutralized random copolymer formed from olefin and unsaturated carboxylic acid monomers, (d) a metal soap obtained by neutralizing an organic acid having up to 29 carbon atoms with a monovalent to trivalent metal ion, the weight ratio of the base resin to the metal soap being from 95:5 to 80:20, said composition having a melt index of at least 1 dg/sec.

2. A golf ball cover composition primarily comprising a mixture of a base resin comprising an ionomer resin component containing (a) a ternary ionomer resin in the form of a metal ion neutralized product of an olefin-unsaturated carboxylic acid-unsaturated carboxylate copolymer having an acid content of up to 12% by weight and (b) a binary ionomer resin in the form of a metal ion neutralized product of an olefin-unsaturated carboxylic acid copolymer, and (d) a metal soap obtained by neutralizing an organic acid having up to 29 carbon atoms with a monovalent to trivalent metal ion, the weight ratio of the base resin to the metal soap being from 95:5 to 80:20, said composition having a melt index of at least 1 dg/sec.

3. A golf ball cover composition primarily comprising a mixture of a base resin comprising an ionomer resin component containing (a) a ternary ionomer resin in the form of a metal ion neutralized product of an olefin-unsaturated carboxylic acid-unsaturated carboxylate copolymer having an acid content of up to 12% by weight and (c) a non-neutralized random copolymer formed from olefin and unsaturated carboxylic acid monomers, and (d) a metal soap obtained by neutralizing an organic acid having up to 29 carbon atoms with a monovalent to trivalent metal ion, the weight ratio of the base resin to the metal soap being from 95:5 to 80:20, said composition having a melt index of at least 1 dg/sec.

4. The golf ball cover composition of claim 1, wherein said mixture has a Shore D hardness which is higher than the Shore D hardness of said base resin and the Shore D hardness of said mixture is up to 5 units harder than the Shore D hardness of said base resin.

5. The golf ball cover composition of claim 1, wherein said metal soap (d) has been formed by double decomposition.

6. The golf ball cover composition of claim 1, wherein said metal soap (d) is magnesium stearate, calcium stearate, zinc stearate or a mixture thereof.

7. The golf ball cover composition of claim 6, wherein said metal soap (d) is a mixture of magnesium stearate and calcium stearate in a weight ratio of from 25:75 to 75:25.

8. The golf ball cover composition of claim 1, further comprising 0.5 to 5 parts by weight of an epoxy group-modified polyolefin or acid-modified polyolefin wax per 100 parts by weight of said mixture.

9. A golf ball comprising a core and a cover formed around the core, wherein said cover is formed from the cover composition of claim 1.

10. A golf ball comprising a core and a cover formed around the core, wherein said cover has a multilayer structure of at least two layers and at least one layer of said cover, other than the outermost layer, is formed from the cover composition of claim 1.

11. The golf ball cover composition of claim 2, wherein said mixture has a Shore D hardness which is higher than the Shore D hardness of said base resin and the Shore D hardness of said mixture is up to 5 units harder than the Shore D hardness of said base resin.

12. The golf ball cover composition of claim 2, wherein said metal soap (d) has been formed by double decomposition.

13. The golf ball cover composition of claim 2, wherein said metal soap (d) is magnesium stearate, calcium stearate, zinc stearate or a mixture thereof.

14. The golf ball cover composition of claim 13, wherein said metal soap (d) is a mixture of magnesium stearate and calcium stearate in a weight ratio of from 25:75 to 75:25.

15. The golf ball cover composition of claim 2, further comprising 0.5 to 5 parts by weight of an epoxy group-modified polyolefin or acid-modified polyolefin wax per 100 parts by weight of said mixture.

16. A golf ball comprising a core and a cover formed around the core, wherein said cover is formed from the cover composition of claim 2.

17. A golf ball comprising a core and a cover formed around the core, wherein said cover has a multilayer structure of at least two layers and at least one layer of said cover, other than the outermost layer, is formed from the cover composition of claim 2.

18. The golf ball cover composition of claim 3, wherein said mixture has a Shore D hardness which is higher than the Shore D hardness of said base resin and the Shore D hardness of said mixture is up to 5 units harder than the Shore D hardness of said base resin.

19. The golf ball cover composition of claim 3, wherein said metal soap (d) has been formed by double decomposition.

20. The golf ball cover composition of claim 3, wherein said metal soap (d) is magnesium stearate, calcium stearate, zinc stearate or a mixture thereof.

21. The golf ball cover composition of claim 20, wherein said metal soap (d) is a mixture of magnesium stearate and calcium stearate in a weight ratio of from 25:75 to 75:25.

22. The golf ball cover composition of claim 3, further comprising 0.5 to 5 parts by weight of an epoxy group-modified polyolefin or acid-modified polyolefin wax per 100 parts by weight of said mixture.

23. A golf ball comprising a core and a cover formed around the core, wherein said cover is formed from the cover composition of claim 3.

24. A golf ball comprising a core and a cover formed around the core, wherein said cover has a multilayer structure of at least two layers and at least one layer of said cover, other than the outermost layer, is formed from the cover composition of claim 3.

* * * * *

UNITED STATES PATENT AND TRADEMARK OFFICE
CERTIFICATE OF CORRECTION

PATENT NO.    : 6,329,458 B1
DATED         : December 11, 2001
INVENTOR(S)   : Rinya Takesue, Yasushi Ichikawa and Shunich Kashiwagi It is certified that error appears in the above-identified patent and that said Letters Patent is hereby corrected as shown below:

<u>Title page,</u>
Item [57], ABSTRACT,
Line 8, delete "dg/sec" and insert therefor -- dg/min. --.

<u>Column 2,</u>
Line 32, delete "dg/sec" and insert therefore -- dg/min. --.

<u>Column 6,</u>
Line 61, delete "dg/sec" and insert therefore -- dg/min. --.

<u>Column 11,</u>
TABLE 1 (continued), line 4 of continued Table, delete "MI (dg/sec)" and insert therefor -- MI (dg/min) --.
TABLE 2, line 9 of Table, delete "MI (dg/sec)" and insert therefor -- MI (dg/min) --.
TABLE 3, line 11 of Table, delete "MI (dg/sec)" and insert therefor -- MI (dg/min) --.
TABLE 4, line 10 of Table, delete "MI (dg/sec)" and insert therefor -- MI (dg/min) --.

<u>Column 12,</u>
TABLE 5 (continued), line 6 or continued Table, delete "MI (dg/sec)" and insert therefor -- MI (dg/min) --.
TABLE 6, line 12 of the Table, delete "MI (dg/sec)" and insert therefor -- MI (dg/min) --.
TABLE 7, line 8 and 15 of Table, delete "MI (dg/sec)" and insert therefor -- MI (dg/min --.

UNITED STATES PATENT AND TRADEMARK OFFICE
CERTIFICATE OF CORRECTION

PATENT NO. : 6,329,458 B1
DATED : December 11, 2001
INVENTOR(S) : Rinya Takesue, Yasushi Ichikawa and Shunich Kashiwagi It is certified that error appears in the above-identified patent and that said Letters Patent is hereby corrected as shown below:

Column 13,
Lines 23, 37 and 51, delete "dg/sec" and insert therefor -- dg/min --.

Signed and Sealed this

Tenth Day of May, 2005

JON W. DUDAS
*Director of the United States Patent and Trademark Office*